(12) United States Patent
Hamada

(10) Patent No.: US 6,754,347 B1
(45) Date of Patent: Jun. 22, 2004

(54) INPUT/OUTPUT UNIT, INPUT/OUTPUT METHOD, AND RECEIVING UNIT

(75) Inventor: Ichiro Hamada, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/367,394

(22) PCT Filed: Dec. 15, 1998

(86) PCT No.: PCT/JP98/05655

§ 371 (c)(1),
(2), (4) Date: Aug. 13, 1999

(87) PCT Pub. No.: WO99/31880

PCT Pub. Date: Jun. 24, 1999

(30) Foreign Application Priority Data

Dec. 15, 1997 (JP) .............................................. 9-344630

(51) Int. Cl.⁷ .............................................. H04N 7/167
(52) U.S. Cl. ........................ 380/216; 380/201; 380/203; 380/205; 380/209; 380/211; 380/227; 380/228; 705/55; 369/47.1; 369/47.12; 369/84; 369/85; 725/71; 725/85; 725/93; 725/100; 725/141; 725/151

(58) Field of Search ................................. 380/201, 205, 380/210, 227, 228; 705/55; 369/47.1, 47.12, 84, 85; 725/71, 74, 85, 93, 141, 142, 151; 455/3.06

(56) References Cited

U.S. PATENT DOCUMENTS 6,052,506 A * 4/2000 Fukushima et al. ........... 386/46

FOREIGN PATENT DOCUMENTS

| JP | 8130516 | 5/1996 |
| JP | 9182066 | 7/1997 |
| JP | 9247616 | 9/1997 |
| JP | 9322148 | 12/1997 |

* cited by examiner

Primary Examiner—Gregory Morse
Assistant Examiner—Paul E. Callahan
(74) Attorney, Agent, or Firm—Lerner, David, Littenberg, Krumholz & Mentlik, LLP

(57) ABSTRACT

A switching portion of an IRD supplies a non-descrambled TS (transport stream) received from a front end portion or a descrambled TS received from a descrambler to a DVCR connected to an IEEE 1394 interface. In addition, data received from the DVCR is supplied to the descrambler.

14 Claims, 8 Drawing Sheets

BROADCASTING SYSTEM

DECODE PORTION 13

CONTROLLER 14

Fig. 9

| OUTPUT MODE | | SWITCH 61 | SWITCH 62 | SWITCH 63 |
|---|---|---|---|---|
| NORMAL MODE | | TERMINAL 61a | FREE | DON'T CARE |
| | DESCRAMBLE MODE (DESCRAMBLE OUTPUT MODE) | TERMINAL 61a | TERMINAL 62a | TERMINAL 63a |
| | NON-DESCRAMBLE MODE (NON-DESCRAMBLE OUTPUT MODE) | TERMINAL 61a | TERMINAL 62b | TERMINAL 63a |
| INPUT MODE | | TERMINAL 61b | FREE | TERMINAL 63b |

INPUT/OUTPUT UNIT, INPUT/OUTPUT METHOD, AND RECEIVING UNIT

TECHNICAL FIELD

The present invention relates to an input/output unit, an input/output method, and a receiving unit. In particular, the present invention relates to an input/output unit, an input/output method, and a receiving unit suitable for use with an IRD (Integrated Receiver and Decoder) and an STB (Set Top Box) that receive digital broadcast data.

Related Art

As the number of satellites is increasing and facilities for digital satellite broadcasts are improving, digital satellite broadcasts are becoming common.

In digital satellite broadcasts, digital data as broadcast programs are often scrambled so as to charge subscribers for programs that they have viewed and listened to and to prevent non-subscribers from viewing and listening to the broadcast programs. When digital data is descrambled for a subscriber, the IRD may store charging information.

When digital video data and digital audio data as broadcast programs are encoded corresponding to for example MPEG (Moving Picture Experts Group) standard and transmitted as an MPEG transport stream (hereinafter referred to as TS), the IRD extracts transport packets (hereinafter referred to as TS packets) of a desired channel (program) from descrambled data and supplies decoded picture and decoded sound to the subscriber (user).

Recently, a system that allows a digital VTR (Video Tape Recorder) to record digital broadcast data received from the IRD and the IRD to decode data reproduced by the VTR has been proposed.

In such a system, it is convenient to allow the IRD to output data that has not been descrambled (non-descrambled data) and an external unit to input data that has not been descrambled (non-descrambled data) or that has been descrambled (descrambled data) to the IRD.

It may be desired that the descrambling process and the charging process be performed by an external unit rather than the IRD. To do that, digital data that has not been descrambled should be output from the IRD to the external unit. When the external unit does not have an MPEG decoder, the external unit should output descrambled data to the IRD.

Disclosure of the Invention

The present invention is made from the above-described point of view. An object of the present invention is to allow a receiving unit (such as an IRD) that receives digital data to flexibly input and output data.

An input/output according to one aspect of the invention is an input/output unit for managing data that is input and output between a receiving unit and an external unit, the receiving unit having receiving means for receiving digital data that has been scrambled at least partly and descramble means for descrambling the digital data, the input/output unit comprising an input/output controlling means for supplying digital data that is received from the receiving means or descrambled data that is received from the descramble means to the external unit and supplying data that is received from the external unit to the descramble means of the receiving unit, the descrambled data being digital data descrambled by the descramble means, and an interface between the input/output controlling means and the external unit.

A receiving unit according to another aspect of the invention is a receiving unit, comprising a receiving means for receiving digital data that has been scrambled at least partly, a descrambling means for descrambling the digital data, an input/output controlling means for supplying digital data that is received from the receiving means or descrambled data that is received from the descramble means to an external unit and supplying data that is received from the external unit to the descramble means, the descrambled data being digital data descrambled by the descramble means, and an interface between the input/output controlling means and the external unit.

An input/output method according to a further aspect of the invention is an input/output method for inputting and outputting data between a receiving unit and an external unit, the receiving unit having receiving means for receiving digital data that has been scrambled at least partly and descramble means for descrambling the digital data, the input/output method comprising the steps of supplying digital data that is received from the receiving means or descrambled data that is received from the descramble means to the external unit and supplying data that is received from the external unit to the descramble means of the receiving unit, the descrambled data being digital data descrambled by the descramble means.

In the input/output unit, the input/output controlling means supplies digital data that is output from the receiving means or descrambled data that is output from the descramble means to the external unit. In addition, the input/output controlling means supplies data that is output from the external unit to the descramble means of the receiving unit.

In the receiving unit, the input/output controlling means supplies digital data that is output from the receiving means or descrambled data that is output from the descramble means to the external unit. In addition, the input/output controlling means supplies data that is output from the external unit to the descramble means of the receiving unit.

In the input/output method, digital data that is output from the receiving means or descrambled data that is output from the descramble means is supplied to the external unit. In addition, data that is output from the external unit is supplied to the descramble means of the receiving unit.

BRIEF DESCRIPTION OF DRAWINGS

FIG. 9 is a table showing switching operations of switches 61 to 63.

BEST MODES FOR CARRYING OUT THE INVENTION

Figure 1:
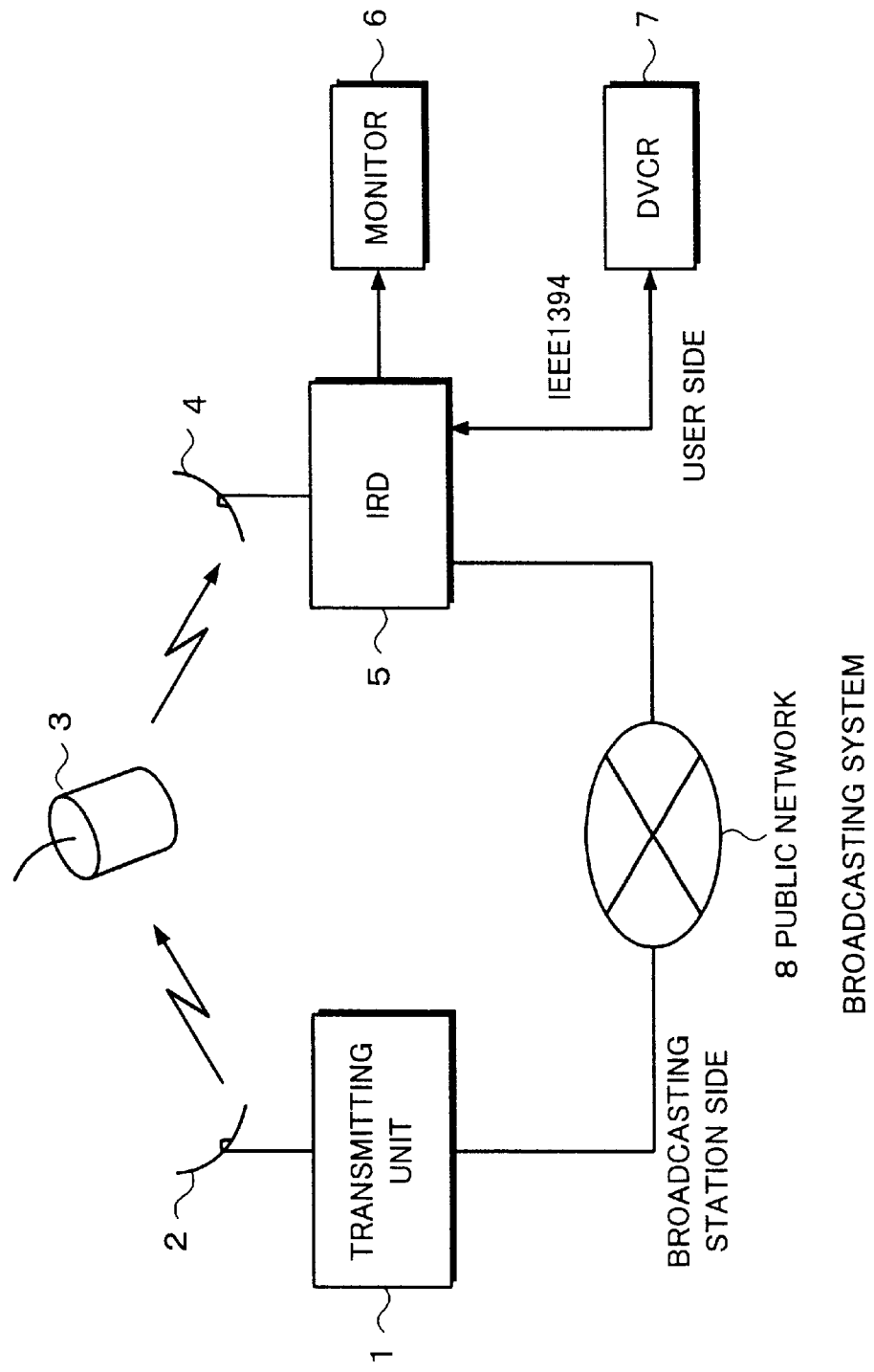
FIG. 1 is a block diagram showing an example of the structure of a broadcasting system according to an embodiment of the present invention.

FIG. 1 shows an example of the structure of a broadcasting system according to an embodiment of the present invention. In this example, the system is a logical aggregation of a plurality of units regardless of whether or not such units are contained in one housing.

On the broadcast station side, a transmitting unit 1 stores digital video data and digital audio data as broadcast programs in such a manner that they have been MPEG-encoded and scrambled. In addition, the transmitting unit 1 forms a TS that contains digital data of a broadcast program and other necessary data, performs several processes such as an error correcting process for the TS, and modulates for the resultant signal by for example QPSK (Quadrature Phase Shift Keying) modulating method. Thereafter, the transmitting unit 1 up-converts the modulated signal and transmits the resultant signal as a radio wave through an antenna (parabola antenna) 2. The transmitting unit 1 forms a TS of which data of six broadcast programs has been multiplexed per transponder.

The radio wave transmitted from the antenna 2 is received by a satellite 3. A transponder (not shown) of the satellite 3 performs several processes such as an amplifying process for the received radio wave and then transmits the resultant signal as a radio wave. The radio wave transmitted from the satellite 3 is received by an antenna (parabola antenna) 4 of the user (subscriber). The radio wave received from the antenna 4 is down-converted and then supplied to an IRD 5 (receiving unit).

The IRD 5 selects a signal from the radio wave received from the antenna 4. In other words, the satellite 3 has a plurality of transponders. The antenna 4 receives radio waves transmitted from the plurality of transponders. Thus, a plurality of radio waves are down-converted. In other words, since the antenna 4 receives a plurality of radio waves, the IRD 5 selects one of radio waves transmitted from the plurality of transponders corresponding to a channel selecting operation of the user.

In addition, the IRD 5 QPSK-demodulates a signal of the selected radio wave (namely, a signal that has been QPSK-modulated) and performs several processes such as an error correcting process for the resultant signal as a TS. Thereafter, the IRD 5 descrambles the TS that has been error-corrected and extracts TS packets of the user selected channel from the descrambled TS. Next, the IRD 5 MPEG-decodes data of the TS packets and supplies the resultant data as a picture to a monitor 6 (and the resultant data as sound to a speaker (not shown)).

The IRD 5 is connected to a DVCR (Digital Video Cassette Recorder) 7 as an external unit corresponding to IEEE (Institute of Electrical and Electronics Engineers) 1394 standard that is a serial interface standard. When necessary, a TS that has been descrambled (descrambled TS) or that has not been descrambled (non-descrambled TS) can be exchanged with the DVCR 7. When the IRD 5 receives a descrambled TS from the DVCR 7, the IRD 5 MPEG-decodes the descrambled TS and outputs the resultant signal to the monitor 6. In contrast, when the IRD 5 receives a non-descrambled TS, the IRD 5 descrambles the non-descrambled TS, MPEG-decodes the resultant signal, and then outputs the resultant signal to the monitor 6.

The DVCR 7 records data received from the IRD 5. In addition, the DVCR 7 reproduces data and supplies the reproduced data to the IRD 5.

After having described a TS, when necessary, the IRD 5 performs a process for charging the user for the TS as a broadcast program (for example, creating a subscriber program viewing/listening history). The resultant charging information is transmitted to the transmitting unit 1 through for example a public network 8. The transmitting unit 1 charges the subscriber for broadcast programs corresponding to the charging information.

Figure 2:
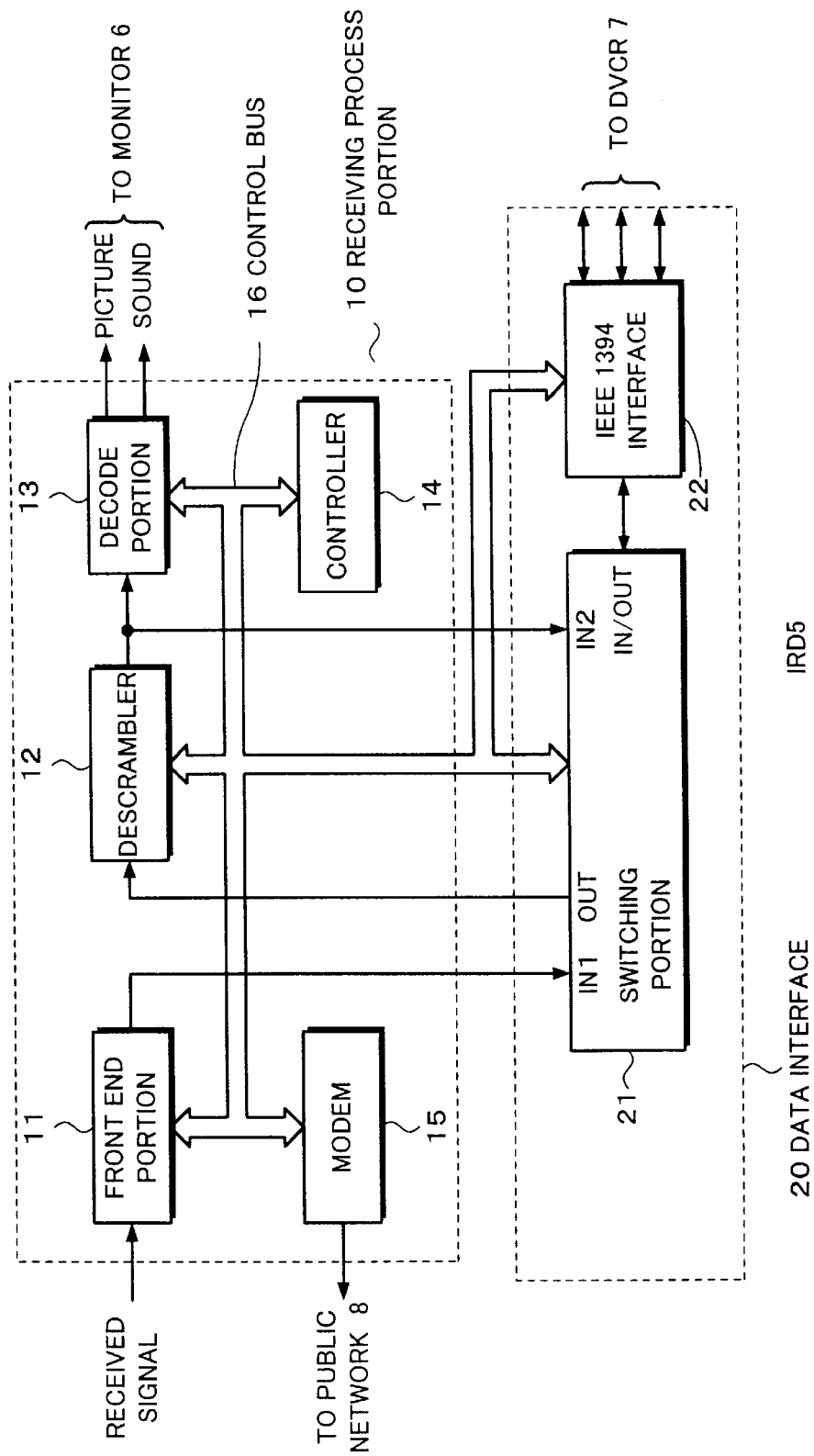
FIG. 2 is a block diagram showing an example of the structure of an IRD5 shown in FIG. 1.

FIG. 2 shows an example of the structure of the IRD 5 shown in FIG. 1.

Referring to FIG. 2, the IRD 5 is mainly composed of a receiving process portion 10 and a data interface 20. The receiving process portion 10 is composed of a front end portion 11, a descrambler 12, a decode portion, a controller 14, and a modem 15. The data interface 20 is composed of a switching portion 21 and an IEEE 1394 interface 22. Individual blocks that compose the receiving process portion 10 and the data interface 20 are connected to each other through a control bus 16.

The front end portion 11 receives a signal through the antenna 4 and then down-converts it. Thereafter, the front end portion 11 performs a predetermined receiving process for the signal that has been down-converted and supplies the resultant signal as a TS (that has not been descrambled) to an input terminal IN1 of the switching portion 21. The descrambler 12 descrambles a non-descrambled TS received from an output terminal OUT of the switching portion 21 and supplies the descrambled TS to the decode portion 13 and an input terminal IN2 of the switching portion 21.

The decode portion 13 extracts TS packets corresponding to the user selected channel from the descrambled TS packets, MPEG-decodes the extracted TS packets, and outputs the resultant signal as a picture and sound. In addition, the decode portion 13 extracts TS packets corresponding to control data from the descrambled TS packets received from the descrambler 12 and supplies the extracted TS packets to the controller 14 through the control bus 16.

The controller 14 performs various processes corresponding to the control data received from the decode portion 13, a signal received from a remote controller (remote commander) operated by the user, and signals received from blocks connected to the control bus 16. In addition, the controller 14 controls the front end portion 11, the descrambler 12, the decode portion 13, and the IEEE 1394 interface 22 that compose the IRD 5 through the control bus 16 corresponding to such signals.

The modem performs communication control for transmitting charging information and so forth to the transmitting unit 1 through the public network 8.

The switching portion 21 supplies a signal that is received from the front end portion 11 through the input terminal INT1 to the descrambler 12 through the output terminal OUT under the control of the controller 14. In addition, the switching portion 21 supplies a non-descrambled TS that is received from the front end portion 11 or a descrambled TS that is received from the descrambler 12 to the DVCR 7 as an external unit through an input/output terminal IN/OUT and the IEEE 1394 interface 22. Moreover, the switching portion 21 supplies data that is received from the DVCR 7 through the IEEE 1394 interface 22 and the input/output terminal IN/OUT to the descrambler 12 through the output terminal OUT.

The IEEE 1394 interface 22 communicates with the DVCR 7 corresponding to the IEEE 1394 standard. Thus, the IEEE 1394 interface 22 transmits data received through the input/output terminal IN/OUT of the switching portion 21 to the DVCR 7. In addition, the IEEE 1394 interface 22 supplies data received from the DVCR 7 to the input/output terminal IN/OUT of the switching portion 21. In the embodiment shown in FIG. 2, the IEEE 1394 interface 22 has three input/output ports for external units. However, according to the present invention, the number of input/output ports of the IEEE 1394 interface 22 is not limited to three.

A conventional IRD does not have a data interface 20. In the conventional IRD, an output signal of a front end portion 11 is directly supplied to a descrambler 12. In contrast, according to the present invention, the IRD 5 has the data interface 20. In addition, an output signal of the front end portion 11 is supplied to the descrambler 12 through the switching portion 21.

Next, the operation modes of the IRD 5 will be described.

When the user views and listens to a broadcast program (hereinafter, the operation mode of the IRD 5 in this case is referred to as normal mode), he or she selects the channel of the broadcast program. In this case, the controller 14 detects a transponder that has transmitted a signal corresponding to the selected channel and controls the front end portion 11 through the control bus 16 to select the signal corresponding to the relevant transponder. The front end portion 11 receives signals from the antenna 4 and selects a signal of a frequency band under the control of the controller 14. In addition, the front end portion 11 performs a predetermined process for the received signal and supplies the resultant signal as a TS to the input terminal IN1 of the switching portion 21.

In this case, the controller 14 controls the switching portion 21 through the control bus 16 to output the signal received from the input terminal IN1 through the output terminal OUT. Thus, the switching portion 21 directly outputs the TS received from the front end portion 11 through the input terminal IN1 to the descrambler 12 through the output terminal OUT under the control of the controller 14.

The descrambler 12 descrambles a scrambled TS received from the switching portion 21 and supplies the descrambled TS to the decode portion 13.

At this point, the controller 14 controls the decode portion 13 through the control bus 16 to decode packets of the user selected channel. The decode portion 13 extracts packets corresponding to the user selected channel from the descrambled TS packets received from the descrambler 12 and then MPEG-decodes the extracted packets. Thus, a picture and sound of the broadcast program corresponding to the user selected channel are output to the monitor.

When a non-descrambled TS is output to the DVCR (hereinafter, the operation mode of the IRD 5 in this case is referred to as the non-descramble output mode), the controller 14 controls the switching portion 21 through the control bus 16 to output the TS received from the front end portion 11 to the IEEE 1394 interface 22.

The switching portion 21 supplies the TS received from the front end portion 11 through the input terminal IN1 to the IEEE 1394 interface 22 through the input/output terminal IN/OUT under the control of the controller 14.

At this point, the controller 14 controls the IEEE 1394 interface 22 through the control bus 16 to output data received from the switching portion 21 to the DVCR 7. The IEEE 1394 interface 22 transmits a non-descrambled TS received from the switching portion 21 to the DVCR 7 corresponding to the IEEE 1394 standard as a communication procedure under the control of the controller 14.

In this case, the controller 14 transmits a record AV/C (Audio Visual/Control) command to the DVCR 7 through the control bus 16 and the IEEE 1394 interface 22. The DVCR 7 records a non-descrambled TS received from the IEEE 1394 interface 22 corresponding to the record AV/C command. The DVCR 7 has an interface with the same function as the IEEE 1394 interface 22. Since the interface of the DVCR 7 and the IEEE 1394 interface 22 communicated through the IEEE 1394 standard, data and commands are exchanged between the IRD 5 and the DVCR 7.

When a descrambled TS is output to the DVCR 7 (hereinafter, the operation mode of the IRD 5 in this case is referred to as the descramble output mode), the controller 14 controls the switching portion 21 through the control bus 16 to output a signal received from the input terminal IN1 to the output terminal OUT and a signal received from the input terminal IN2 to the input/output terminal IN/OUT. The switching portion 21 directly outputs the TS received from the front end portion 11 through the input terminal IN1 to the descrambler 12 through the output terminal OUT under the control of the controller 14. The descrambler 12 descrambles the TS and supplies the descrambled TS to the input terminal IN2 of the switching portion 21. The switching portion 21 outputs the TS received from the descrambler 12 through the input terminal IN2 to the IEEE 1394 interface 22 through the input/output terminal IN/OUT.

As in the non-descramble output mode, the IEEE 1394 interface 22 transmits a descrambled TS received from the switching portion 21 to the DVCR 7. The DVCR 7 records the descrambled TS.

When data recorded in the DVCR 7 is reproduced and supplied to the IRD 5 (hereinafter, the operation mode of the IRD 5 in this case is referred to as the input mode), the controller 14 transmits a reproduction AV/C command to the DVCR 7 through the control bus 16 and the IEEE 1394 interface 22. The DVCR 7 reproduces data recorded therein corresponding to the reproduction AV/C command.

At this point, the controller 17 controls the IEEE 1394 interface 22 through the control bus 16 to supply data received from the DVCR 7 to the switching portion 21. The IEEE 1394 interface 22 receives data reproduced from the DVCR 7 (in this case, the data is a TS) corresponding to the IEEE 1394 standard as a communication procedure under the control of the controller 14. Thereafter, the IEEE 1394 interface 22 supplies the TS received from the DVCR 7 to the input/output terminal IN/OUT of the switching portion 21.

The switching portion 21 outputs the TS received from the input/output terminal IN/OUT to the descrambler 12 through the output terminal OUT.

When a TS received from the switching portion 21 has been scrambled, the descrambler 12 descrambles the TS and supplies the descrambled TS to the decode portion 13. In contrast, when a TS received from the switching portion 21 has not been scrambled, the descrambler 12 directly supplies the TS to the decode portion 13. As in the normal mode, the decode portion 13 MPEG-decodes the TS received from the descrambler 12.

The descrambler 12 determines whether or not a TS (TS packets) received from the switching portion 21 has been scrambled based on two bits of scramble control information contained in a TS packet shown in FIG. 5 (the scramble control information will be described later).

Figure 3:
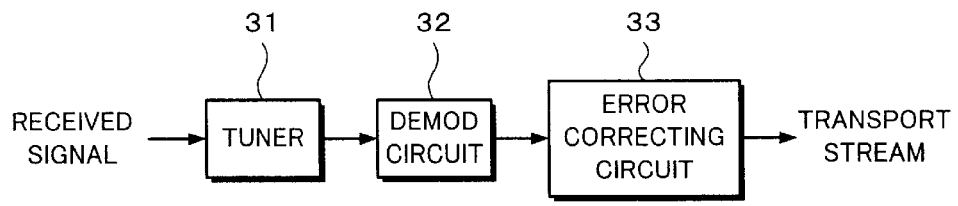
FIG. 3 is a block diagram showing an example, of the structure of a front end portion 11 shown in FIG. 2.

FIG. 3 shows an example of the structure of the front end portion 11 shown in FIG. 2.

Signals received from the antenna 4 are supplied to a tuner 31. The tuner 31 receives the signals from the antenna 4 and selects a signal of a frequency band of a predetermined transponder corresponding to a control signal received from the controller 14 through the control bus 16. The selected signal is supplied to a demodulating circuit 32. The demodulating circuit 32 QPSK-demodulates the signal received from the tuner 31 and supplies the resultant signal as a TS to an error correcting circuit 33. The error correcting circuit 33 performs an error correcting process for the TS received from the demodulating circuit 32 and supplies the resultant signal to the input terminal IN1 of the switching portion 21.

Figure 4:
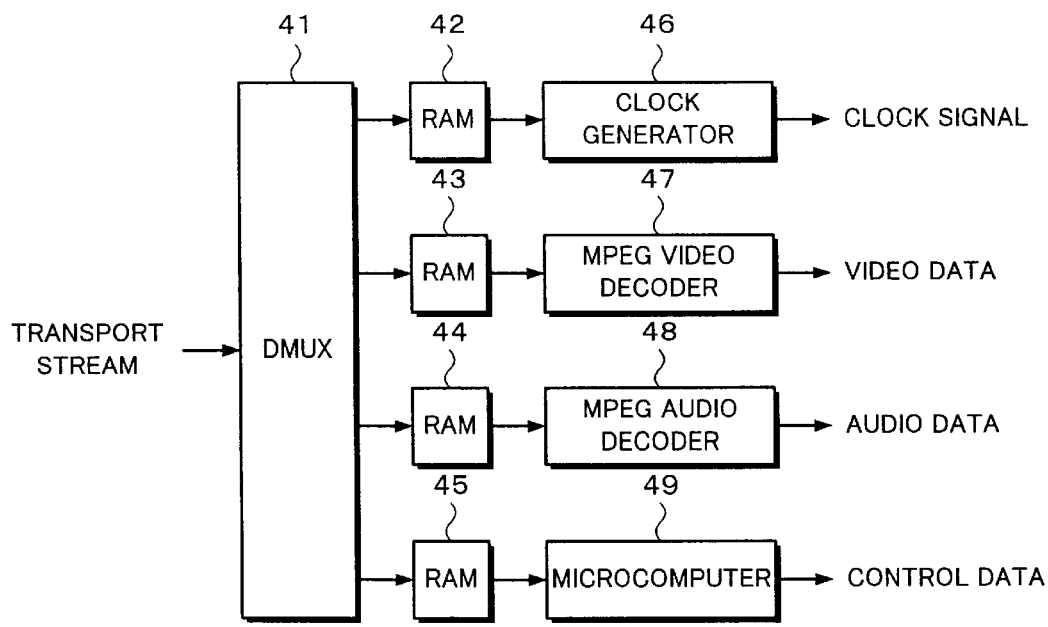
FIG. 4 is a block diagram showing an example of the structure of a decode portion 13 shown in FIG. 2.

FIG. 4 shows an example of the structure of the decode portion 13 shown in FIG. 2.

A descrambled TS received from the descrambler 12 is supplied to a DMUX (demultiplexer) 41. The DMUX 41 extracts required TS packets with reference to a PID (Packet Identification) thereof and supplies the extracted TS packets to relevant RAMs (Random Access Memories) 42 to 45.

In other words, the DMUX 41 extracts a TS packet that contains information necessary for generating a clock signal (the information is for example PCR (Presentation Clock Reference)) and supplies the TS packet to the RAM 42. The DMUX 41 extracts TS packets that have video data and audio data of a user selected channel (the TS packets have been MPEG-encoded) and supplies the extracted TS packets to the RAM 43 and RAM 44, respectively. In addition, the DMUX 41 extracts a TS packet that has information for controlling various portions and supplies the extracted TS packet to the RAM 45.

The remaining TS packets that have not been extracted by the DMUX 41 are discarded.

The RAMs 42 to 45 store the relevant TS packets extracted by the DMUX 41.

The clock generator 46 reads a TS packet from the RAM 42 and generates a clock signal based on the information contained in the TS packet. The clock signal generated by the clock generator 46 is supplied to an MPEG video decoder 47, an MPEG audio decoder 48, and other relevant blocks.

The MPEG video decoder 47 and the MPEG audio decoder 48 read TS packets from the RAMs 43 and 44, respectively. The MPEG video decoder 47 and the MPEG audio decoder 48 MPEG-decode video data and audio data that have been MPEG-encoded, respectively.

A microcomputer 49 reads a TS packet from the RAM 45 and extracts control data for controlling each block based on the information contained in the TS packet and supplies the control data to relevant blocks through the control bus 16.

Figure 5:
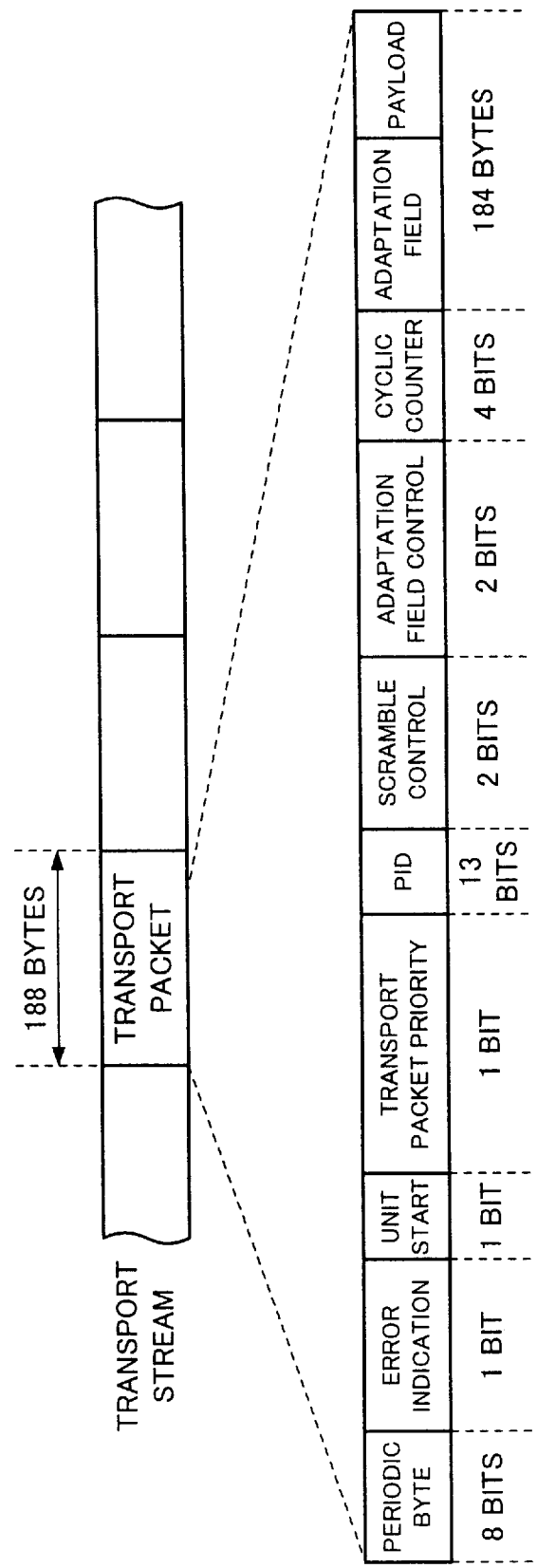
FIG. 5 is a schematic diagram showing the data structure of a transport stream.

FIG. 5 shows the data structure of a TS.

Referring to FIG. 5, a TS is composed of TS packets (the data length of each TS packet is 188 bytes).

The first four bytes (32 bits) of each TS packet are a so-called packet header. The remaining 184 bytes are an adaptation field and a payload. Alternatively, the remaining 184 bytes are only a payload.

Since information contained in the packet header is defined in the MPEG2 standard, only data required in the present invention will be briefly described. A PID is placed in 13 bits from the 12-th bit to 24-th bit. The PID is used to identify the current TS packet. The PID is followed by a scramble control portion of two bits. The scramble control portion represents whether or not the payload has been scrambled. In addition, the scramble control portion represents the type of the payload. As described above, with reference to the scramble control portion, the descrambler 12 determines whether or not (the payload of) the current TS packet has been scrambled.

The PCR as information for generating the clock signal is placed at one or a plurality of successive positions of the adaptation field. According to the MPEG2 standard, the PCR can be placed in at least one position of the adaptation field.

Figure 6:
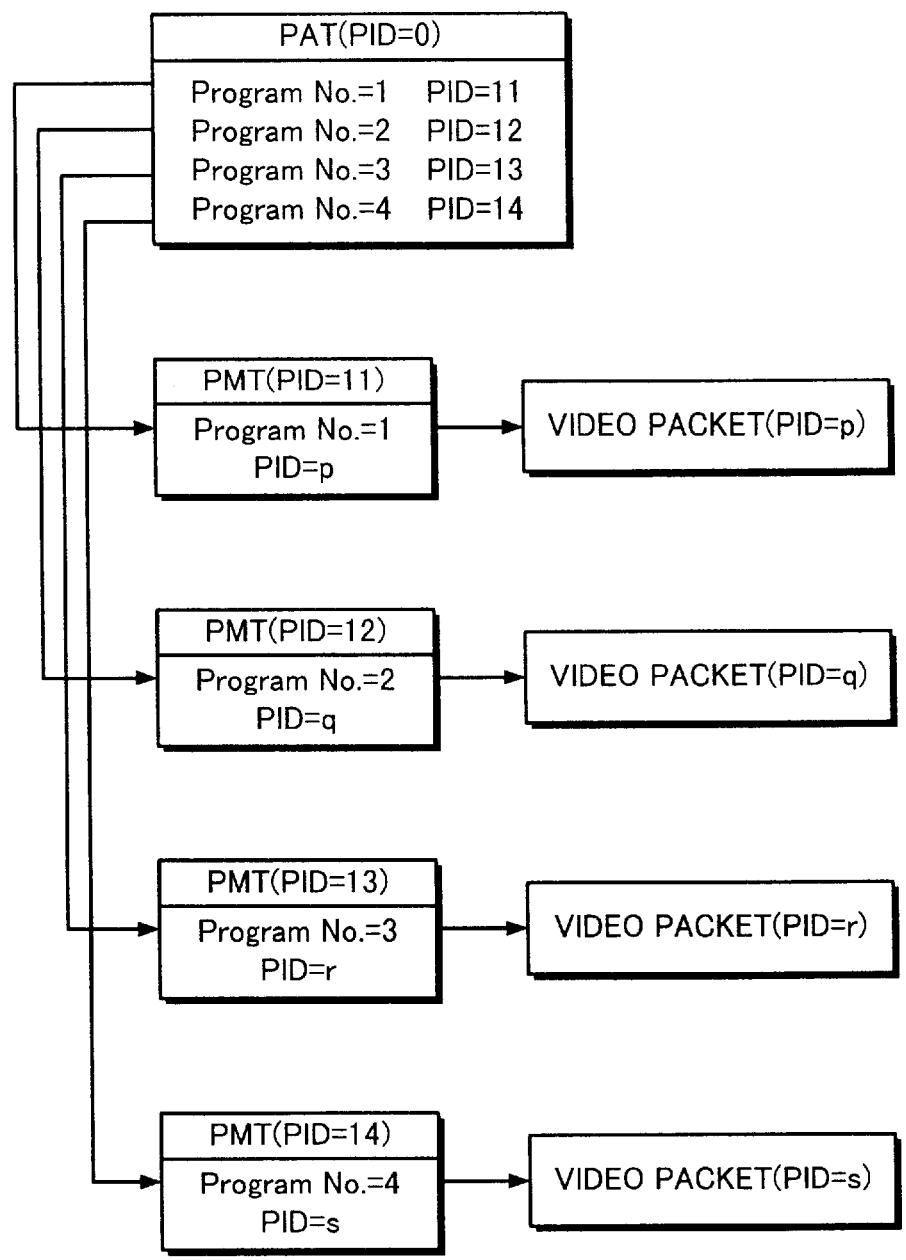
FIG. 6 is a schematic diagram for explaining an extracting method for TS packets of a predetermined channel.

As described above, with reference to the PID contained in the current TS packet, the DMUX 41 (see FIG. 4) extracts required TS packets. Next, with reference to FIG. 6, a method for extracting a TS packet that contains video data of a desired channel will be described.

A TS packet containing video data of a particular channel is assigned a unique PID corresponding thereto. Thus, to extract a TS packet of a desired channel, the value of the PID assigned to the packet is required. Consequently, a TS has a TS packet that contains additional information table PSI (Program Specific Information) that represents the relation between channels and PIDs.

Examples of the PSI are a PAT (Program Association Table) and PMT (Program Map Table).

The PAT is assigned a predetermined constant value (0x00) (where 0x represents hexadecimal notation) as a PID. The PAT contains the PID of the PMT to be referenced for obtaining a TS packet corresponding to a particular broadcast program number (channel).

In addition, the PMT contains a PID of a TS packet (video packet) of video data of a broadcast program corresponding to a particular program number.

Thus, to extract a TS packet of video data of a particular channel, a packet whose PID is 0x00 (namely, a PAT) is received and then a PID corresponding to a program number assigned to the desired channel is detected. Thereafter, a TS packet with the PID is received. Namely, the PMT is received. In addition, the PID is extracted from the PMT. Thus, a video packet with the PID is received.

In reality, when a TS packet containing video data of a channel whose broadcast program number "1" is extracted, the PAT represents that the PID of the PMT of the program number is "11". When a TS packet with the PMT is received, the PID of a TS packet containing video data of the channel whose broadcast program number is "1" is "p". Thus, a TS video packet whose PID is "p" is extracted.

The header of each TS packet shown in FIG. 5 is removed by the DMUX 41. The remaining TS packet is supplied to a relevant one of the RAMs 42 to 45 (more accurately, the portion of the TS packet from which the header is removed is supplied to a relevant one of the RAMs 42 to 45).

Figure 7:
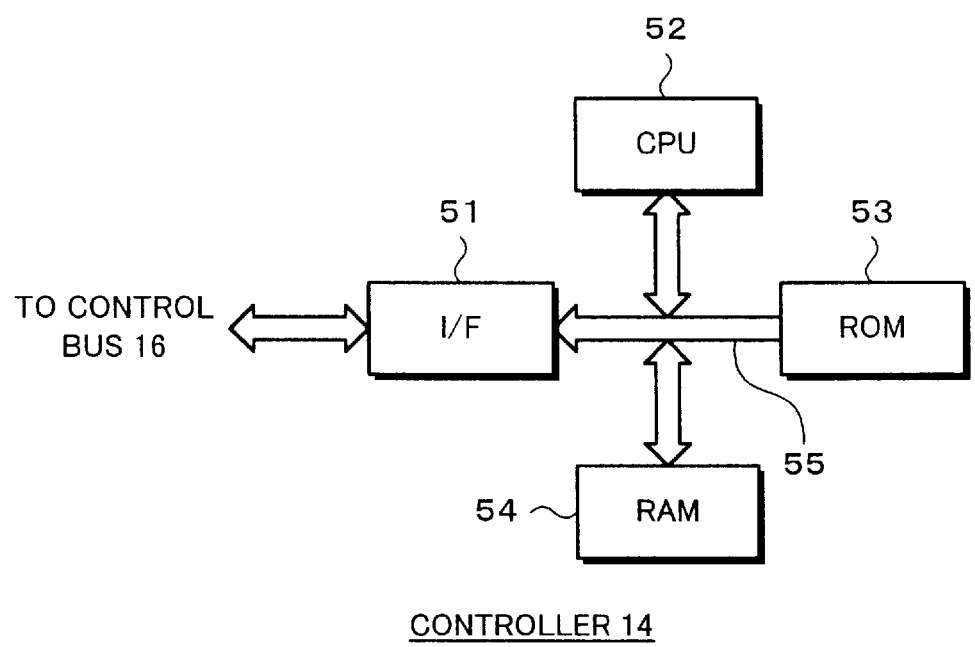
FIG. 7 is a block diagram showing an example of the structure of a controller 14 shown in FIG. 2.

FIG. 7 shows an example of the structure of the controller 14 shown in FIG. 2.

An I/F (Interface) 51 connects the control bus 16 and an internal bus 55. The I/F 51 supplies a signal received through the control bus 16 to a CPU (Central Processor Unit) 52 through the internal bus 55. In addition, the I/F 51 outputs control data received from the CPU 52 through the internal bus 55 to a relevant block through the control bus 16.

The CPU 52 performs various processes corresponding to a signal received from the I/F 51 through the internal bus 55. In addition, the CPU 52 generates control data and supplies it to the I/F 51. The I/F 51 also supplies a signal corresponding to an operation of a remote controller by the user to the CPU 52. The CPU 52 performs various processes corresponding to signals received from the I/F 51.

A ROM (Read Only Memory) 53 stores an IPL (Initial Program Loading) program, a boot strap program, and data. After the power of the IRD 5 is turned on or the IRD 5 is reset, the CPU 52 reads the programs and data from the ROM 53. Thus, the IRD 5 gets started.

A RAM 54 stores programs and data necessary for the operation of the CPU 52 (the programs are OS (Operating System) and an application program). The ROM 53 is composed of for example a flash memory.

Figure 8:
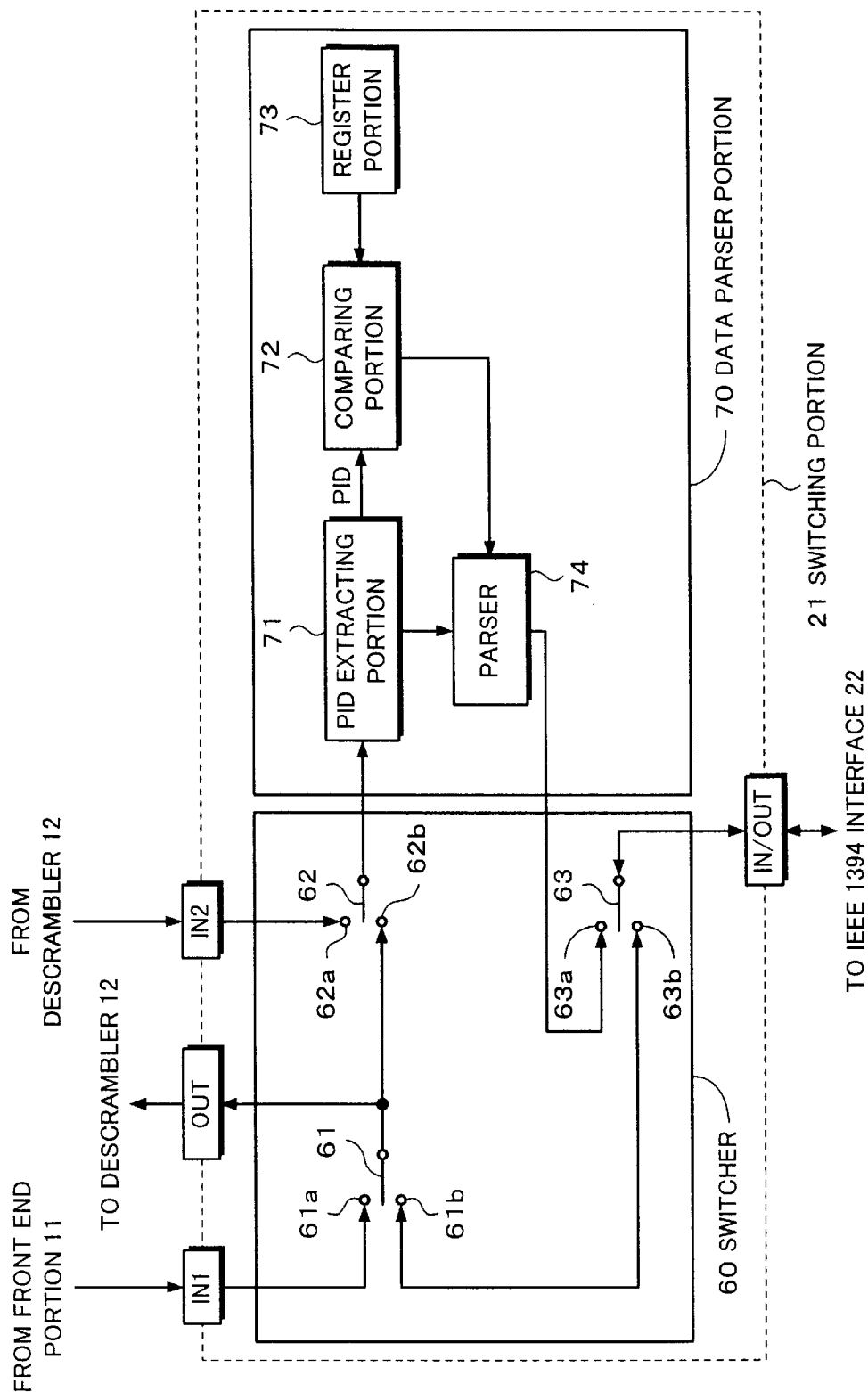
FIG. 8 is a block diagram showing an example of the structure of a switching portion 21 shown in FIG. 2.

FIG. 8 shows an example of the structure of the switching portion 21 shown in FIG. 2. As shown in FIG. 8, the switching portion 21 is mainly composed of a switcher 60 and a data parser portion 70.

The switcher 60 is composed of switches 61 to 63.

A terminal 61a of the switch 61 is connected to the input terminal IN1. Thus, a non-descrambled TS is supplied from the front end portion 11 to the terminal 61a of the switch 61 through the input terminal IN1. A terminal 61b of the switch 61 is connected to a terminal 63b of the switch 63. The switch 61 is connected to a terminal 62b of the switch 62 and the output terminal OUT. The switch 61 selects one of the terminals 61a and 61b under the control of the controller 14.

A terminal 62a of the switch 62 is connected to the input terminal IN2. Thus, a descrambled TS is supplied from the descrambler 12 to the switch 62 through the input terminal IN2. The switch 62 is connected to a PID extracting portion 71 of the data parser portion 70. The switch 62 selects one of the terminals 62a and 62b under the control of the controller 14. Alternatively, the switch 62 selects neither the terminal 62a nor 62b under the control of the controller 14.

The switch 63 is connected to the input/output terminal IN/OUT. The switch 63 selects one of the terminals 63a and 63b under the control of the controller 14. An output signal of a parser 74 of the data parser portion 70 is supplied to the terminal 63a.

The data parser portion 70 is composed of the PID extracting portion 71, a comparing portion 72, a register portion 73, and the parser 74. The data parser portion 70 extracts only a required TS packet from a TS received from the switch 62 and supplies the extracted TS packet to the terminal 63a.

In other words, the PID extracting portion 71 directly outputs a TS received from the switch 62 to the parser 74. In addition, the PID extracting portion 71 detects a PID from each TS packet that composes the TS and supplies the PID to the comparing portion 72. The comparing portion 72 compares the PID stored in the register portion 73 with the PID received from the PID detecting portion 71. When they match, the comparing portion 72 supplies a match signal to the parser 74. The register portion 73 stores the PID received from the controller 14 through the control bus 16. In other words, in the case that the user records only a broadcast program of a desired channel to the DVCR 7, when he or she designates the channel, the controller 14 supplies a PID of a TS packet corresponding to the channel to the register portion 73 through the control bus 16. The register portion 73 stores the PID received from the controller 14. The register portion 73 can store a plurality of PIDs.

The parser 74 extracts a TS packet from the TS received from the PID extracting portion 71 corresponding to the match signal received from the comparing portion (namely, a TS packet with the same PID as the PID stored in the register portion 73) and supplies the extracted TS packet to the terminal 63a. The TS packets that have not been extracted by the parser 74 are discarded.

Next, the operations of the switching portion 21 corresponding to the normal mode, the descramble output mode, the non-descramble output mode, and the input mode will be described. In this example, it is assumed that a particular PID has been assigned to the register portion 73 by the controller 14.

In each mode, the controller 14 controls the switches 61 to 63 to select respective terminals as shown in FIG. 9.

Thus, in the normal mode, the switch 61 selects the terminal 61a; the switch 62 selects neither the terminal 62a nor terminal 62b (hereinafter, this state is referred to as the free state); and the switch 63 is in a don't care state (namely, the switch 63 selects either the terminal 63a or the terminal 63b). Consequently, a non-descrambled TS received from the front end portion 11 to the terminal 61a through the input terminal IN1 is directly supplied from the output terminal OUT to the descrambler 12 through the switch 61.

In the descramble output mode, as shown in FIG. 9, the switch 61 selects the terminal 61a; the switch 62 selects the terminal 62a; and the switch 63 selects the terminal 63a.

Thus, as in the normal mode, a non-descrambled TS received from the front end portion 11 to the terminal 61a through the input terminal IN1 is directly supplied from the output terminal OUT to the descrambler 12 through the switch 61.

The descrambler 12 descrambles the non-descrambled TS received from the output terminal OUT and supplies a descrambled TS to the terminal 62a through the input terminal IN2. Since the switch 62 selects the terminal 62a, the descrambled TS received through the, terminal 62a is supplied to the PID extracting portion 71 through the switch 62.

The PID extracting portion 71 directly supplies a TS received from the switch 62 to the parser 74. In addition, the PID extracting portion 71 detects a PID from each TS packet that composes the TS and supplies the PID to the comparing portion 72. The comparing portion 72 compares the PID stored in the register portion 73 with the PID received from the PID extracting portion 71. Only when they match, the comparing portion 72 supplies a match signal to the parser 74.

When the parser 74 receives the match signal from the comparing portion 72, the parser 74 extracts a TS packet corresponding to the match signal (namely, a TS packet with the same PID as the PID stored in the register portion 73) (hereinafter, this TS packet is referred to as a match packet), removes the other TS packets, and outputs the match packet to the terminal 63a.

In this case, the parser 74 outputs match packets to the terminal 63a at intervals of a predetermined time period. When the relative time period between the match packets is lost, it is difficult to MPEG-decode them.

Since the switch 63 selects the terminal 63a, a match packet received from the parser 74 is supplied to the IEEE 1394 interface 22 through the switch 63 and the input/output terminal IN/OUT. The IEEE 1394 interface 22 converts the format of the match packet (in this case, a descrambled TS packet) received from the switching portion 21 corresponding to the IEEE 1394 standard and transmits the converted signal to the DVCR 7.

At this point, as described above, the controller 14 transmits the record AV/C command to the DVCR 7 through the IEEE 1934 interface. Thus, the DVCR 7 records data received from the IEEE 1934 interface 22.

In this case, a match packet sequence received from the parser 74 has blank portions because TS packets other than match packets have been removed. Thus, the match packet sequence should be arranged so that other units can properly process it. To arrange the match packet sequence, for example, a PAT, a PMT, an SIT (Selection Information Table), and a DIT (Discontinuity Information Table) are added. Thus, the controller 14 generates a PAT, a PMT, an SIT, and a DIT and supplies them to the IEEE 1394 interface 22 through the control bus 16. The IEEE 1394 interface 22 places the PAT, PMT, SIT, and DIT as TS packets at the blank portions of the match packet sequence and transmits the resultant sequence as a partial transport stream (hereinafter referred to as a partial TS) to the DVCR 7.

For details of the PAT, the PMT, the SIT, and the DIT, refer to for example ETS 300468, Digital Video Broadcasting (DVB): Specification for Service Information (SI) in DVB system.

As shown in FIG. 9, in the non-descramble output mode, the switch 61 selects the terminal 61a; the switch 62 selects the terminal 62b; and the switch 63 selects the terminal 63a.

Thus, a non-descrambled TS received from the front end portion 11 to the terminal 61a through the input terminal IN1 is supplied to the terminal 62 through the switch 61. In this case, since the switch 62 selects the terminal 62b, a non-descrambled TS is supplied to the PID extracting portion 71 through the switch 62.

Thereafter, the same process as the descramble output mode is performed. Thus, a non-descrambled TS is transmitted and recorded to the DVCR 7.

In the input mode, as shown in FIG. 9, the switch 61 selects the terminal 61b; the switch 63 selects the terminal 63b; and the switch 62 is in a free state.

In this case, the controller 14 transmits the reproduction AV/C command to the DVCR 7 through the IEEE 1394 interface 22. Thus, the DVCR 7 starts the reproducing operation and transmits the reproduced data to the IEEE 1394 interface 22.

The IEEE 1394 interface 22 converts the IEEE 1394 format of data reproduced from the DVCR 7 into the format of the original TS (in this case, partial TS) and supplies the partial TS to the switch 63 through the input/output terminal IN/OUT. As described above, since the switch 63 selects the terminal 63b, the TS received from the IEEE 1394 interface 22 is supplied to the terminal 61b through the switch 63 and the terminal 63b.

As described above, since the switch 61 selects the terminal 61b, the TS received through the terminal 63b is supplied to the output terminal OUT through the switch 61. Since the switch 62 is in the free state, the TS that is output through the switch 61 is not supplied to the PID detecting portion 71.

The TS that is output from the output terminal OUT is supplied to the descrambler 12. When necessary, descrambler 12 descrambles the TS and supplies the descrambled TS to the decode portion 13.

The IEEE 1394 interface 22 converts data received from the data interface 20 into isochronous packets and isochronously transmits them to the DVCR 7. In addition, the IEEE 1394 interface 22 converts a command for the DVCR 7 into an asynchronous packet corresponding to IEEE 1394-1995 standard and asynchronously transmits it to the DVCR 7. Moreover, the IEEE 1394 interface 22 receives isochronous data, an asynchronous command, a status, and so forth from the DVCR 7 and transmits them to relevant blocks such as the controller 14.

As described above, the IRD 5 has the switching portion 21 that supplies a non-descrambled TS received from the front end portion 11 or a descrambled TS (descrambled data) received from the descrambler 12 to the DVCR 7 and that supplies data received from the DVCR 7 to the descrambler 12. Thus, both a non-descrambled TS and a descrambled TS can be output to the DVCR 7. In addition, when necessary, data reproduced from the DVCR 7 can be descrambled and MPEG-encoded. In other words, with the IRD 5, data can be flexibly input and output.

In addition, since a TS received from the front end portion 11 is output from the output terminal OUT through the switch 61 and supplied to the terminal 62b, while the user is viewing a particular broadcast program, it can be output to and recorded by the DVCR 7 as an external unit.

In addition, since the IEEE 1394 interface 22 is disposed as an interface between the switch portion 21 and the DVCR 7, while TS packets are being exchanged with an external unit, AV/C commands can be also exchanged. Moreover, when the IRD 5 is connected to a high speed IEEE 1394 network, a TS can be transmitted and received to/from a unit connected to the IEEE 1394 network.

In addition, with the switching portion 21 and the IEEE 1394 interface 22, the user is provided with an intelligent service using GUI (Graphical User Interface) of the IRD 5. In other words, when a TS is reproduced from the DVCR 7 and the TS is decoded and displayed by the IRD 5, the IEEE 1394 interface 22 receives a status that represents whether or not the DVCR 7 is correctly reproducing data. When the DVCR 7 is not correctly reproducing data, the controller 14 allows the switches 61 to 63 not to select any terminals. Thus, abnormal data can be prevented from being input to the descrambler 12 and the decode portion 13. Thus, an abnormal picture can be prevented from being displayed.

In this case, with the GUI of the IRD 5, a message that represents that data cannot be normally reproduced can be output to the user.

In addition, the data parser portion 70 of the switching portion 21 extracts only TS packets of a desired channel and outputs the extracted TS packets to an external unit. Thus, when a broadcasting station transmits scenes photographed at a plurality of angles in one program with a plurality of channels of a frequency band of one transponder, the user can record only scenes photographed at a desired angle.

In the above-described embodiment, the present invention was applied to a broadcasting system that transmits digital broadcast programs through a satellite. However, the present invention can be applied to digital broadcasts using for example a CATV network, Internet, a ground line, and other communication mediums.

In the above-described embodiment, the IEEE 1394 interface 22 is disposed as an interface between the switching portion 21 and the DVCR 7. An interface other than the IEEE 1394 interface 22 may be used. In addition, a parallel interface rather than a serial interface may be used.

In the above-described embodiment, the DVCR as an external unit is connected to the IRD 5. However, the external unit connected to the IRD 5 is not limited to the DVCR.

In the above-described embodiment, the switching portion 21 extracts particular TS packets from a TS and records the extracted TS packets to the DVCR 7. Alternatively, the entire TS may be supplied and recorded to the DVCR 7.

In the above-described modifications, digital data received from the DVCR is supplied to the descrambler through the IEEE 1394 interface. When the digital data has been scrambled, it is descrambled by the descrambler. When the digital data has not been scrambled, it is directly supplied to the decoder. Alternatively, only when digital data received from the DVCR has been scrambled, the digital data may be supplied to the descrambler. When the digital data has not been scrambled, the digital data may be directly supplied to the decoder.

As described above, according to the input/output unit, the receiving unit, and the input/output method of the present invention, digital data that is received from the receiving means or descrambled data that is received from the descramble means is supplied to an external unit. In addition, data that is received from an external unit is supplied to the descramble means of the receiving unit. Thus, digital data can be flexibly input and output.

What is claimed is:

1. An input/output unit for managing data that is input and output between a receiving unit and an external unit, the receiving unit having receiving means for receiving digital data that has been at least partly scrambled and descramble means for descrambling digital data to form descrambled data, the input/output unit comprising:

input/output controlling means for supplying the received digital data or the descrambled data to the external unit and for supplying data received from the external unit to the descramble means; and an interface between said input/output controlling means and the external unit;

said input/output controlling means including:

extracting means for extracting only predetermined data from the received digital data or the descrambled data, and for outputting the extracted data to said interface;

first selecting means for selecting one of the received digital data and the data received from the external unit as first selected data, and for supplying the first selected data to the descramble means;

second selecting means for selecting one of the received digital data and the descrambled data as second selected data, and for supplying the second selected data to said extracting means; and third selecting means for selecting one of the extracted data from said extracting means and the data received from the external unit as third selected data, for supplying the third selected data to the external unit when the third selected data is the extracted data from said extracting means, and for supplying the third selected data to the descramble means when the third selected data is the data received from the external unit.

2. The input/output unit as set forth in claim 1, wherein when the first selected data supplied to the descramble means from said input/output controlling means has been scrambled, the descramble means descrambles the first selected data, and when the first selected data supplied to the descramble means from said input/output controlling means has not been scrambled, the descramble means does not descramble the first selected data.

3. The input/output unit as set forth in claim 1, wherein the received digital data and the descrambled data include a plurality of packets, and said extracting means extracts only predetermined packets from the plurality of packets forming the received digital data or the descrambled data, and supplies the extracted packets to said interface so that each of the extracted packets retains its relative time period.

4. The input/output unit as set forth in claim 1, wherein the descramble means determines whether or not the digital data has been scrambled based on scramble state information contained in the digital data.

5. The input/output unit as set forth in claim 1, wherein said interface processes the extracted data from said extracting means so that the external unit normally processes the extracted data from said extracting means.

6. The input/output unit as set forth in claim 1, wherein the received digital data and the descrambled data include a plurality of packets; and said extracting means includes:

detecting means for detecting packet identification information from the plurality of packets forming the received digital data or the descrambled data;

storing means for storing the packet identification information of at least one of the plurality of packets to be extracted;

comparing means for comparing the packet identification information detected by said detecting means with the packet identification information stored in said storing means; and supplying means for supplying an extracted packet to said third selecting means, the packet identification information of the extracted packet corresponding to the packet identification information stored in said storing means.

7. A receiving unit, comprising:

receiving means for receiving digital data that has been at least partly scrambled;

descrambling means for descrambling digital data to form descrambled data;

input/output controlling means for supplying the received digital data or the descrambled data to an external unit and for supplying data received from the external unit to said descramble means; and an interface between said input/output controlling means and the external unit;

said input/output controlling means including:

extracting means for extracting only predetermined data from the received digital data or the descrambled data, and for outputting the extracted data to said interface;

first selecting means for selecting one of the received digital data and the data received from the external unit as first selected data, and for supplying the first selected data to said descramble means;

second selecting means for selecting one of the received digital data and the descrambled data as second selected data, and for supplying the second selected data to said extracting means; and third selecting means for selecting one of the extracted data from said extracting means and the data received from the external unit as third selected data, for supplying the third selected data to the external unit when the third selected data is the extracted data from said extracting means, and for supplying the third selected data to said descramble means when the third selected data is the data received from the external unit.

8. The receiving unit as set forth in claim 7, wherein when the first selected data supplied to said descramble means from said input/output controlling means has been scrambled, said descramble means descrambles the first selected data, and when the first selected data supplied to said descramble means from said input/output controlling means has not been scrambled, said descramble means does not descramble the first selected data.

9. The receiving unit as set forth in claim 7, wherein the received digital data and the descrambled data include a plurality of packets, and said extracting means extracts only predetermined packets from the plurality of packets forming the received digital data or the descrambled data, and supplies the extracted packets to said interface so that each of the extracted packets retains its relative time period.

10. The receiving unit as set forth in claim 7, wherein said descramble means determines whether or not the digital data has been scrambled based on scramble state information contained in the digital data.

11. The receiving unit as set forth in claim 7, wherein said interface processes the extracted data from said extracting means so that the external unit normally processes the extracted data from said extracting means.

12. The receiving unit as set forth in claim 7, wherein the received digital data and the descrambled data include a plurality of packets; and said extracting means includes:
   detecting means for detecting packet identification information from the plurality of packets forming the received digital data or the descrambled data;
   storing means for storing the packet identification information of at least one of the plurality of packets to be extracted;
   comparing means for comparing the packet identification information detected by said detecting means with the packet identification information stored in said storing means; and
   supplying means for supplying an extracted packet to said third selecting means, the packet identification information of the extracted packet corresponding to the packet identification information stored in said storing means.

13. An input/output method for inputting and outputting data between a receiving unit and an external unit, the receiving unit being operable to receive digital data that has been at least partly scrambled, the input/output method comprising the steps of:

selecting one of the received digital data and data received from the external unit as first selected data;
   descrambling the first selected data to form descrambled data;
   selecting one of the received digital data and the descrambled data as second selected data;
   extracting only predetermined data from the second selected data to form extracted data;
   outputting the extracted data to the external unit; and
   selecting one of the extracted data and the data received from the external unit as third selected data, supplying the third selected data to the external unit when the third selected data is the extracted data, and descrambling the third selected data when the third selected data is the data received from the external unit.

14. A system for managing data, comprising:

a receiving unit having receiving means for receiving digital data that has been at least partly scrambled and descramble means for descrambling digital data to form descrambled data;
   an external unit;
   input/output controlling means for supplying the received digital data or the descrambled data to said external unit and for supplying data received from said external unit to said descramble means; and
   an interface between said input/output controlling means and said external unit;

said input/output controlling means including:
      extracting means for extracting only predetermined data from the received digital data or the descrambled data, and for outputting the extracted data to said interface;
      first selecting means for selecting one of the received digital data and the data received from said external unit as first selected data, and for supplying the first selected data to said descramble means;
      second selecting means for selecting one of the received digital data and the descrambled data as second selected data, and for supplying the second selected data to said extracting means; and
      third selecting means for selecting one of the extracted data from said extracting means and the data received from said external unit as third selected data, for supplying the third selected data to said external unit when the third selected data is the extracted data from said extracting means, and for supplying the third selected data to said descramble means when the third selected data is the data received from said external unit.

* * * * *